US010388187B2

(12) United States Patent
Jonker et al.

(10) Patent No.: US 10,388,187 B2
(45) Date of Patent: Aug. 20, 2019

(54) MEDICAL SIMULATOR HANDPIECE (71) Applicant: MOOG BV, Nieuw-Vennep (NL)

(72) Inventors: Arno Jonker, Nieuwegein (NL); Johannes Gerhard Daniël Karssen, The Hague (NL); Dimitrios Iakovou, The Hague (NL)

(73) Assignee: Moog BV, Nieuw-Vennep (NL)

( * ) Notice: Subject to any disclaimer, the term of this patent is extended or adjusted under 35 U.S.C. 154(b) by 244 days.

(21) Appl. No.: 15/503,734

(22) PCT Filed: Aug. 17, 2015

(86) PCT No.: PCT/EP2015/068871
§ 371 (c)(1),
(2) Date: Feb. 14, 2017

(87) PCT Pub. No.: WO2016/026821
PCT Pub. Date: Feb. 25, 2016

(65) Prior Publication Data
US 2017/0278428 A1 Sep. 28, 2017

(30) Foreign Application Priority Data
Aug. 22, 2014 (EP) ..................... 14181951

(51) Int. Cl.
*G09B 23/28* (2006.01)
(52) U.S. Cl.
CPC .......... *G09B 23/283* (2013.01); *G09B 23/28* (2013.01); *G09B 23/285* (2013.01)

(58) Field of Classification Search
USPC ........................................ 434/262
See application file for complete search history.

(56) References Cited

U.S. PATENT DOCUMENTS

| 5,766,016 | A | 6/1998 | Sinclair et al. |
| 6,113,395 | A | 9/2000 | Hon |
| 8,716,973 | B1 | 5/2014 | Lammertse |
| 2002/0143319 | A1 | 10/2002 | Brock |
| 2004/0142315 | A1 | 7/2004 | Bumann et al. |

FOREIGN PATENT DOCUMENTS

| WO | 9929238 | 6/1999 |
| WO | 03013374 | 2/2003 |
| WO | 2011141873 | 11/2011 |

OTHER PUBLICATIONS

EPO, European Search Report and Written Opinion for EP 14181951 Feb. 11, 2015.
ISA/EP, International Search Report and Written Opinion for PCT/EP2015/068871 Oct. 28, 2015.

*Primary Examiner* — Kesha Frisby
(74) *Attorney, Agent, or Firm* — Hodgson Russ LLP (57) ABSTRACT

A medical simulator handpiece (112; 114) has a body (156; 180), a first formation (157; 184) representing a first medical tool and is characterized by a second formation (159, 161; 186) representing a second, different medical tool in which the first and second formations are connected and spaced apart to permit a user to manipulate one or other of the first and second formations.

16 Claims, 6 Drawing Sheets

MEDICAL SIMULATOR HANDPIECE

The present invention is concerned with a handpiece for a medical simulator. More specifically, the present invention is concerned with a multifunctional handpiece for use with an eye surgery simulator.

Simulators for medical procedures are known in the art, such as the applicant's Simodont™ dental trainer. Known simulators comprise a computer which controls the simulation and hosts a virtual environment, a VDU displaying the simulated environment, and one or two handpieces which may be connected to the computer to provide an input. The simulated environment comprises the subject, as well as virtual versions of tools controlled by the handpieces. The tools may be surgical instruments (scalpels, syringes etc) or other devices (such as mirrors or probes). The handpieces are connected to sensors which determine their position, which is used to control the position of the tools in the virtual environment. In more sophisticated systems, the handpieces are mounted on a haptic feedback system which allows the computer to control the forces the user feels through the handpieces. making a more realistic simulation possible.

The VRMagic EyeSi™ trainer is a known virtual reality simulator for intraocular surgical training. A variety of handpieces are provided which represent different surgical tools (for example a scalpel, forceps or syringe). In order to swap tools, the user has to stop the simulated procedure, move his eyes away from the virtual microscope, lay off the handpiece, pick up a different handpiece, move his eyes back to the microscope and resume the procedure.

In real-life eye surgery a nurse hands the instruments to the surgeon upon verbal request. Therefore the above-described system is deficient in this respect—in real-life the surgeon would not need to take his eyes off the subject.

The present invention aims to overcome this problem.

According to a first aspect of the invention there is provided a medical simulator handpiece comprising a body, a first formation representing a first medical tool, characterised by a second formation representing a second, different medical tool in which the first and second formations are connected and spaced apart to permit a user to manipulate one or other of the first and second formations.

Advantageously, provision of more than one formation on the same handpiece allows the user to keep their attention on the simulation rather than looking away to change tools. This offers a more realistic simulation compared to the prior art.

Preferably one of the first and second formations represents scissors or forceps. This can be provided via a first member and a second member movably mounted to the body, the first and second members being movable towards and away from each other. The members therefore simulate the handles of a pair of scissors or forceps, requiring a "squeezing" force to operate them. Alternatively, a single member movably mounted to the body can provide a similar level of realism, with the body acting as the second member.

Preferably the first member and the second member are pivotably mounted to the body. Preferably the first member and the second member are resiliently biased in a direction away from the body. Advantageously these features make the formation more "scissor-like".

One of the first and second formations may represent a syringe. In this case, the formation comprises a plunger formation. Preferably the body defines a flange proximate the end of the body which receives the plunger. This makes the formation more "syringe like". In one embodiment the plunger formation is static relative to the handpiece, and forces applied thereto may be sensed in order to detect when the user actuates the plunger. In an alternative embodiment, the plunger formation is movable relative to the handpiece, and a displacement transducer may be used to detect movement.

One of the first and second formations may represent a scalpel or knife handle. In this instance, the a generally cylindrical part of the body may be used, or preferably a "handle-like" formation is provided, which may include ridges, knurling or similar surface features to aid gripping.

Preferably at least one of the first and second formations comprises a sensor configured to sense a user input indicative of manipulation of the formation. This allows a simulation to include e.g. cutting simulation, or in the case of the syringe fluid injection/withdrawal. More preferably the first and second formations comprise a first and second sensor respectively, the sensors configured to sense user inputs indicative of manipulation of the formations.

The first and second formations may comprises an actuator configured to provide haptic feedback to a user. This allows the user to obtain a realistic feel of e.g. cutting through tissue, or injecting a fluid through computer controlled simulation.

The invention also provides a medical simulator comprising a computer having a memory and a processor, the memory storing medical simulation software configured to simulate a medical procedure when executed by the processor, an input device connected to the computer, the input device configured to provide a user input to the simulated medical procedure, the input device comprising a medical simulator handpiece according to the first aspect.

Advantageously, the present invention eliminates the need for tool swapping during the simulated procedure, which would be unrealistic.

Preferably the medical simulation software is configured to receive data from the first and second sensors, wherein the simulation software is configured to switch between a first mode indicative of use of the first formation in which data from the second sensor does not influence the simulation and a second mode indicative of use of the second formation in which data from the first sensor does not influence the simulation.

This "switching" of modes allows inadvertent actuation of the unused formation to be ignored.

A medical simulator and handpiece according to the present invention will now be described with reference to the following figures in which.

Figure 1:
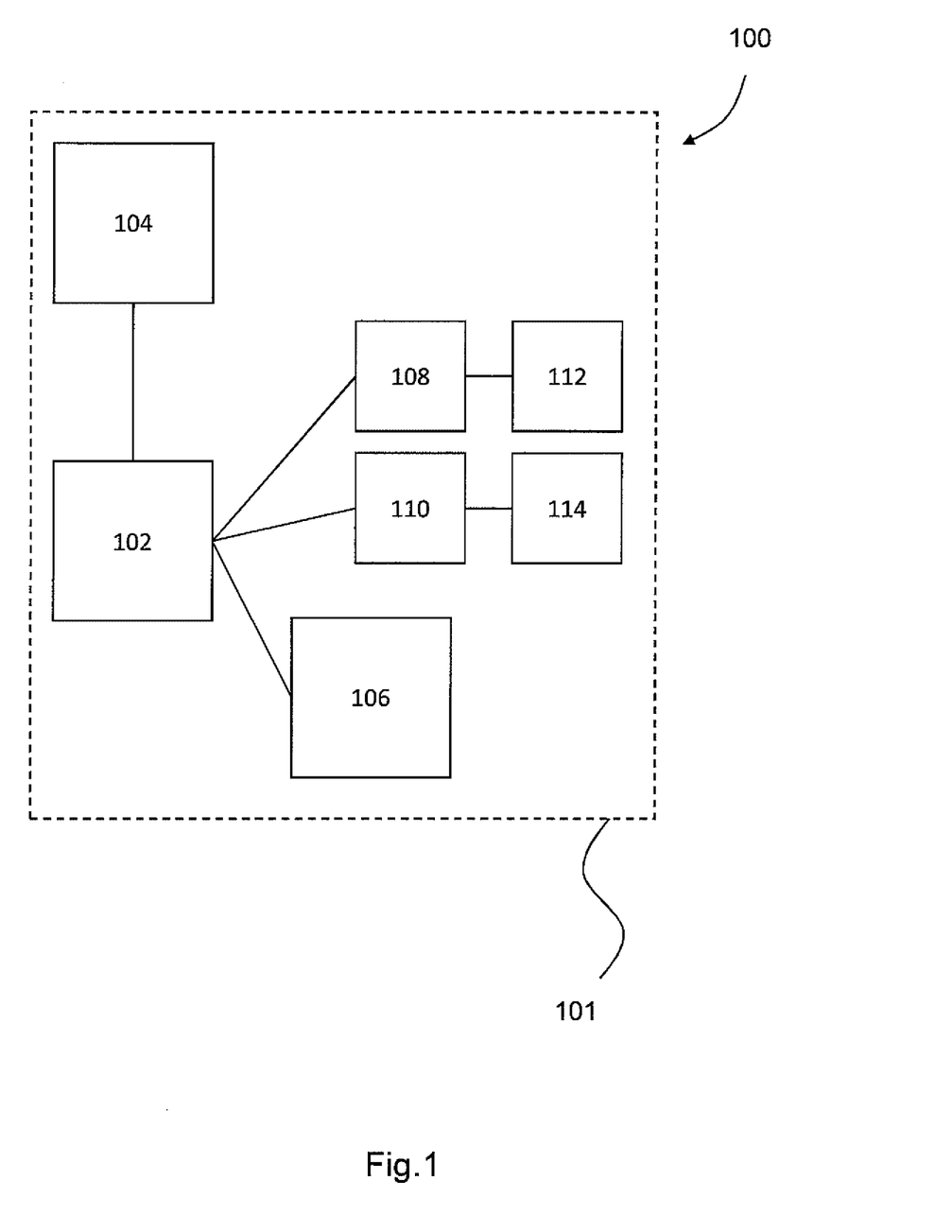
FIG. 1 is a schematic view of a simulator comprising a handpiece in accordance with the present invention.

FIG. 1 is a schematic view of an eye surgery simulator 100. The simulator 100 comprises a housing 101 in which a computer 102 having a memory and a processor. The processor is arranged to execute software stored on the memory, in particular software configured to simulate a medical procedure. The computer 102 is connected to a VDU 104, a model 106 and a first and second haptic system 108, 110 mounted to the housing 101. The haptic systems 108, 110 (described in detail below with reference to FIG. 2)

each comprise a first and second handpiece 112, 114 respectively. The simulator 100 is configured to accept voice commands from a user.

The model 106 represents part of the subject (for example a human head) and provides the necessary mechanical environment for the operation to take place. For example, the surgeon can rest his hands on the head during the procedure.

Figure 2:
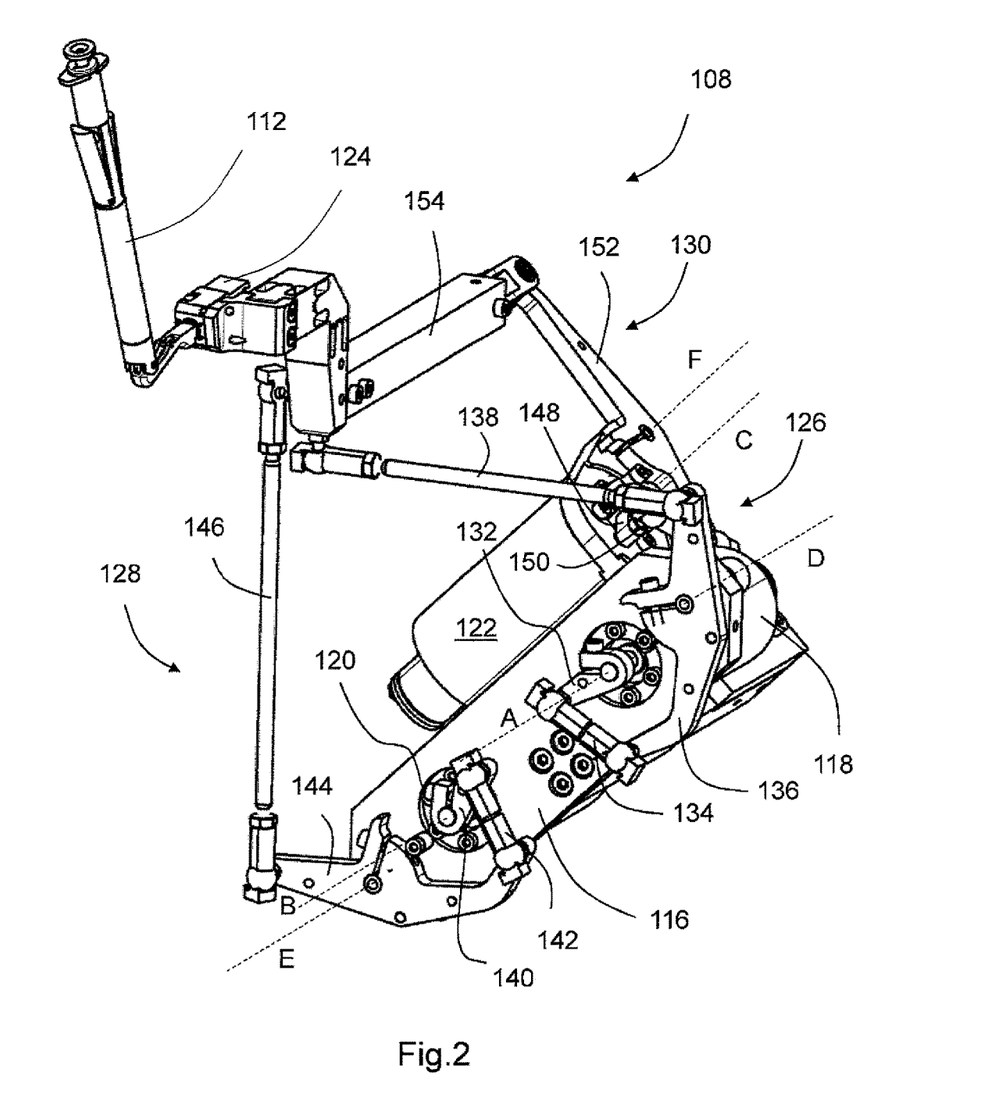
FIG. 2 is a perspective view of a subassembly of the simulator of FIG. 1.

Referring to FIG. 2, the first haptic system 108 is shown comprising the first handpiece 112. The first haptic system 108 comprises a frame 116 mounted to the housing 101. A first, second and third motor 118, 120, 122 are mounted to the housing 116. The first and second motors 118, 120 have parallel and offset output axes A, B with the third motor 122 having an axis C perpendicular to the axes A and B.

The first handpiece 112 (to be described) is mounted on a gimbal 124 for rotation in three degrees of freedom (about global axes X, Y, Z). The gimbal 124 is connected to the frame 116 by a first, second and third linkage 126, 128, 130.

The first linkage 126 comprises a crank 132 extending radially from the output of the first motor 118. The crank 126 is connected at a position spaced from the motor to a first link 134. The first link 134 is connected to a second link 136 pivoted to the frame 116 about a second link axis D (parallel to axis A). On the opposite side of the axis D to the first link 134, the second link 136 is connected to a first pushrod 138. The first pushrod 138 is connected to the gimbal 124.

Similarly, the second linkage 128 comprises a crank 140 extending radially from the output of the second motor 120. The crank 140 is connected at a position spaced from the motor to a third link 142. The third link 142 is connected to a fourth link 144 pivoted to the frame 116 about a fourth link axis E (parallel to axis B). On the opposite side of the axis E to the third link 142, the fourth link 144 is connected to a second pushrod 146. The second pushrod 146 is connected to the gimbal 124.

Similarly, the third linkage 130 comprises a crank 148 extending radially from the output of the third motor 122. The crank 148 is connected at a position spaced from the motor to a fifth link 150. The fifth link 150 is connected to a sixth link 152 pivoted to the frame 116 about a sixth link axis F (parallel to axis C). On the opposite side of the axis F to the fifth link 150, the sixth link 152 is connected to a third pushrod 154. The third pushrod 154 is connected to the gimbal 124.

The first, second and third pushrods 138, 146, 154 are oriented perpendicular to one another, and are arranged to move axially along their lengths in response to actuation of the respective motors 118, 120, 122 respectively. As such, the global position of the gimbal 124 and hence the handpiece 112 is a function of the rotation of the motors 118, 120, 112.

The computer 102 is configured to both receive information indicating the position of the motor shafts, and to control actuation of the motors. As such, a control scheme is used in which the global position of the handpiece 112 is known by the computer 102, which is also able to provide haptic feedback to the handpiece 112 as determined by the characteristics of the virtual model. The position of the virtual tools within the virtual environment is displayed on the VDU 104.

The handpiece 112 comprises an IMU (inertial measurement unit) which measures the position, speed and/or acceleration of the handpiece (in particular in rotation) and provides a signal to the computer 102.

By using data from the first haptic system 108, and the IMU, the position of the virtual tools within the virtual environment is displayed on the VDU 104.

The second haptic system 110 is similar to the first haptic system 108 and as such will not be described in detail here.

Figure 3:
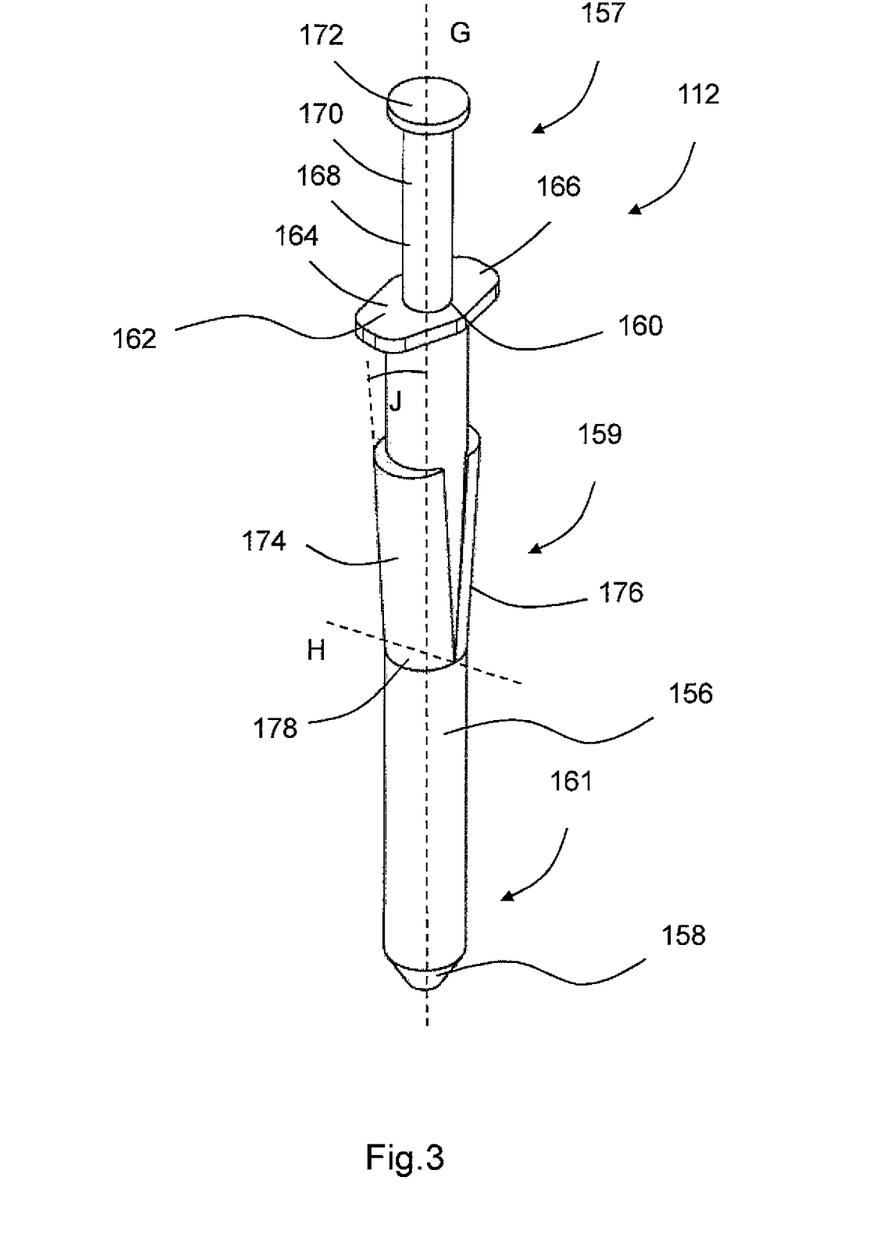
FIG. 3 is a perspective view of a first handpiece of the simulator FIG. 1, as shown in FIG. 2.

Turning to the first handpiece 112 as shown in FIG. 3, it comprises a main body 156 which is generally cylindrical having a longitudinal axis G and dimensioned to permit gripping by the human hand (typically having a diameter in the range 5 to 20 mm). At a first end of the body 156 there is provided a tool tip 158 configured for connection to the gimbal 124 as shown in FIG. 2. The handpiece 112 defines a syringe formation 157, a scissors formation 159, and a scalpel formation 161.

Starting with the syringe formation 157, at a second end of the body 156 it comprises an elongate blind bore 160 extending along the axis G. At the opening of the bore 160 there is provided a flange 162 extending in a plane perpendicular to the axis G. The flange 162 is not rotationally symmetric, instead comprising a first and second wing 164, 166 extending in radially opposite directions.

A plunger formation 168 is provided having a cylindrical plunger body 170 and an end flange 172. The outer diameter of the plunger body 170 is sized to fit into the bore 160 of the body 156 thus forming the syringe formation 157. Unlike a real syringe, the plunger 168 cannot be moved along the axis G. A force sensor is provided within the body 170 to measure the axial forces on the plunger 168 relative to the body 156 along the axis G, thereby sensing the user's intended withdrawal or insertion of the simulated syringe plunger.

Between the syringe formation 157 and the scalpel formation 161 there is provided the scissors formation 159. The scissors formation 159 comprises a pair of diametrically opposed wings 174, 176.

The first wing 174 is attached to the body 156 at a pivot 178 defining a pivot axis H. The first wing extends from the pivot 178 at an angle J to the axis G, and is resiliently biased to this rest position by an internal spring (not shown). The first wing 174 can be pivoted about the pivot axis H into a recess (not visible) in the body 156.

The second wing 176 operates in the same way as the first wing 174, and as such the wings 176, 176 can be squeezed together by the hand of a user against the resilience of the springs to simulate use of a real pair of scissors. Both wings extend radially outwardly moving away from the tool tip, like a pair of scissors.

The scalpel formation 161 is simply a plain, cylindrical part of the body 156 which can be gripped to simulate a scalpel in use.

The formations 157, 159, 161 are spaced along the axis G making each one individually grippable.

Force transducers are provided to measure the force acting on the springs driven by the wings 174, 176 (and thereby their displacement as a result of Hooke's law) for input into the simulated environment.

Figure 4:
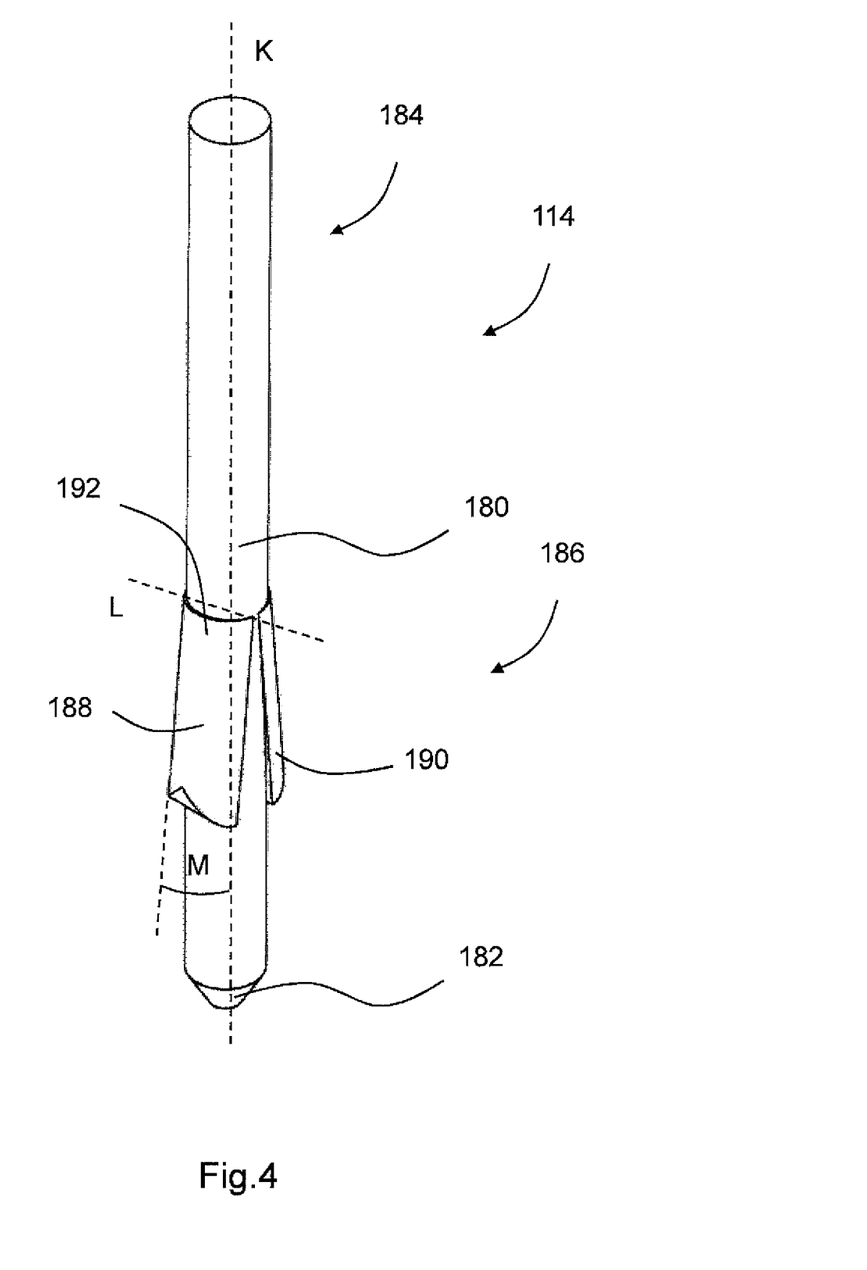
FIG. 4 is a perspective view of a second handpiece of the simulator FIG. 1.

Turning to the second handpiece 114 as shown in FIG. 4, it comprises a main body 180 which is generally cylindrical having a longitudinal axis K and dimensioned to permit gripping by the human hand (typically having a diameter in the range 5 to 20 mm). At a first end of the body 180 there is provided a tool tip 182 configured for connection to a gimbal. The handpiece 114 defines a scalpel formation 184 and a forceps formation 186.

The formation 184 is simply a plain, cylindrical part of the body 180 which can be gripped to simulate a scalpel in use.

The forceps formation 186 comprises a pair of diametrically opposed wings 188, 190.

The first wing 188 is attached to the body 180 at a pivot 192 defining a pivot axis L. The first wing 188 extends from the pivot 192 at an angle M to the axis K, and is resiliently biased to this rest position by an internal spring (not shown). The first wing 188 can be pivoted about the pivot axis L into a recess (not visible) in the body 180.

The second wing 190 operates in the same way as the first wing 188, and as such the wings 188, 190 can be squeezed together by the hand of a user against the resilience of the springs to simulate use of a real pair of forceps. Both wings extend radially outwardly moving towards the tool tip, like a pair of forceps.

Force sensors are provided to measure the travel of the wings 188, 190 for input into the simulated environment by measuring the force exerted by the internal springs.

The computer 102 is configured to recognise input from the selected formation of each handpiece only. For example, if the first handpiece 112 is set to "syringe" mode, then the computer 102 will only recognise signals from forces applied to the plunger 168 (as well as global movements of the handpiece 112). The computer will ignore inadvertent actuation of the wings 174, 176. Switching between tools is achieved by voice input to the computer 100, thus keeping the user's hands free.

As such, the software can be placed in a plurality of modes to selectively recognise inputs from one formation, but ignore input from another formation.

Figure 5A:
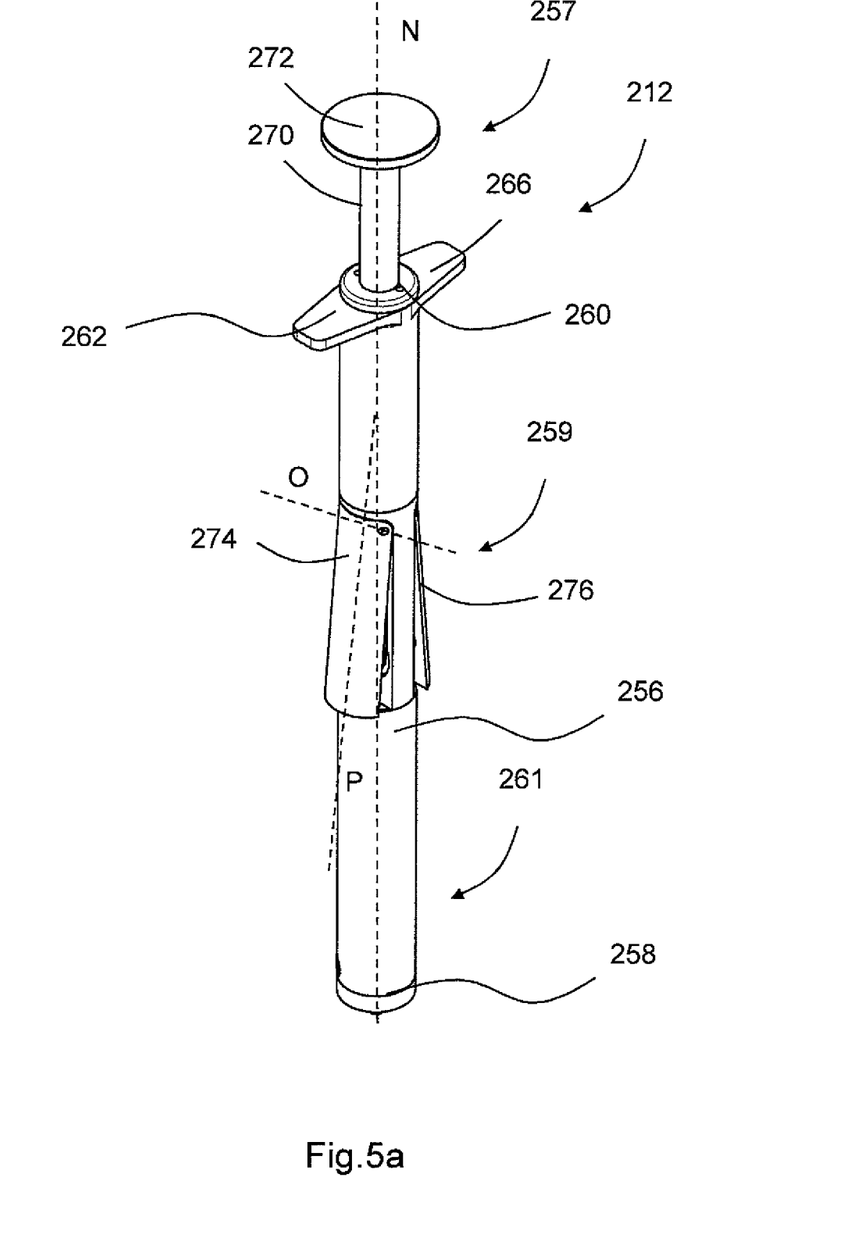
FIGS. 5a to 5c are various views of an alternative handpiece for use with the simulator of FIG. 1.
Figures 5B, 5C:
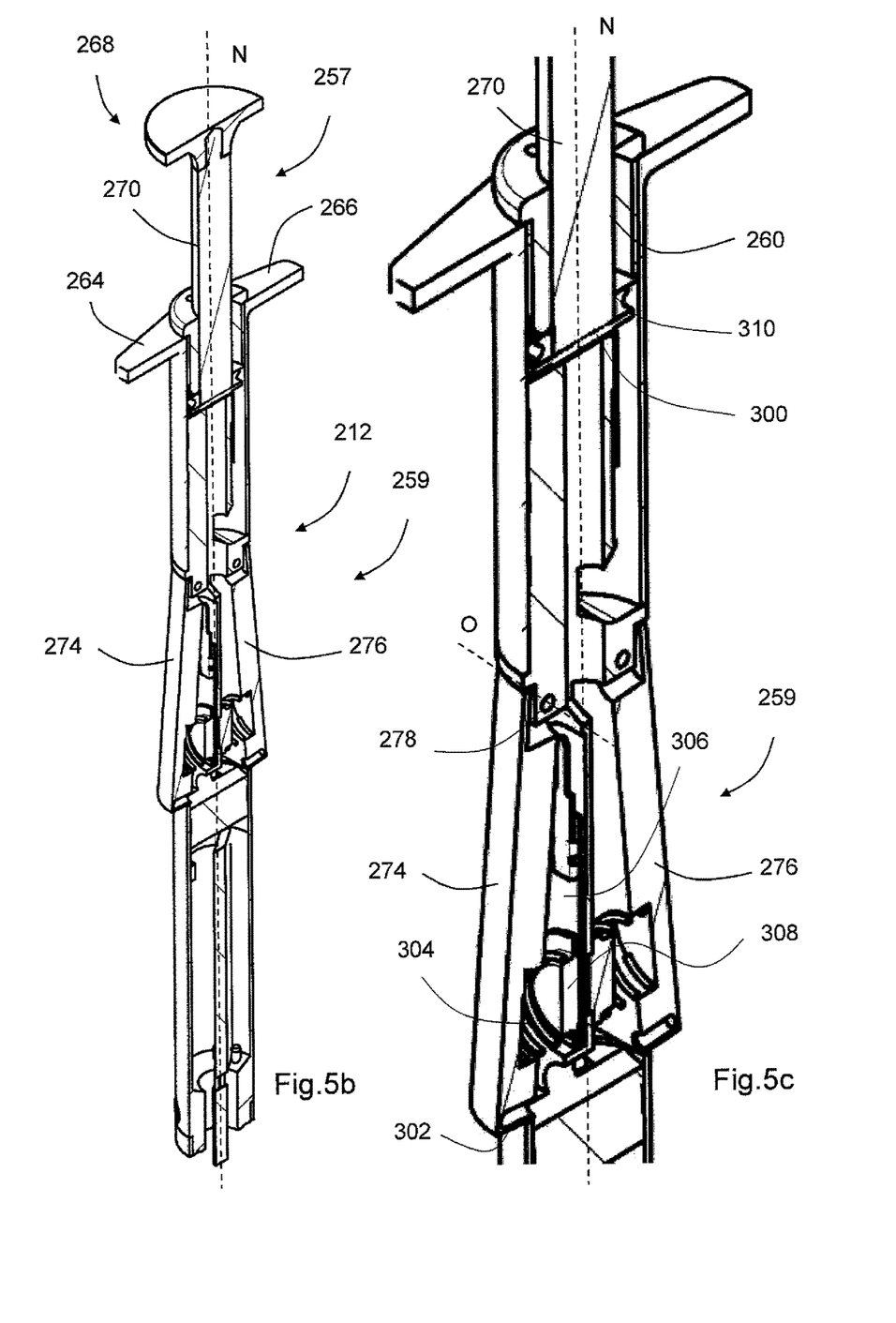

Turning to the third handpiece 212 as shown in FIGS. 5*a* to 5*c*, it comprises a main body 256 which is generally cylindrical having a longitudinal axis N and dimensioned to permit gripping by the human hand (typically having a diameter in the range 5 to 20 mm). At a first end of the body 256 there is provided a tool tip 258 configured for connection to the gimbal 124 as shown in FIG. 2. The handpiece 212 defines a syringe formation 257, a forceps formation 259, and a scalpel formation 261.

Starting with the syringe formation 257, at a second end of the body 156 it comprises an elongate blind bore 260 extending along the axis N. Referring to FIGS. 5*b* and 5*c*, the handpiece 212 is shown in cross-section. At the opening of the bore 260 there is provided a flange 262 extending in a plane perpendicular to the axis G. The flange 262 is not rotationally symmetric, instead comprising a first and second wing 264, 266 extending in radially opposite directions.

A plunger formation 268 is provided having a cylindrical plunger body 270 and an end flange 272. The outer diameter of the plunger body 270 is sized to fit into the bore 260 of the body 256 thus forming the syringe formation 257. At the embedded end of the plunger body 270, it is held in place inside the bore 260 by a resilient X-ring 310. Unlike a real syringe, the plunger 268 cannot be moved along the axis N. A force sensor 300 is provided within the body 270 at the embedded end of the plunger body 270 to measure the axial forces on the plunger 268 relative to the body 256 along the axis N, thereby sensing the user's intended withdrawal or insertion of the simulated syringe plunger. The force sensor 300 is a resistive force sensor.

The X-ring 310 is fitted between the plunger body 270 and the bore 260 such that a pre-load is exerted on the force sensor 300. The X-ring acts to provide a resilient axial force to a position which exerts a pre-load on the sensor 300. In this manner, a withdrawal of the syringe can be detected from a no-load condition (relating to a reduction from the pre-load towards zero).

Between the syringe formation 257 and the scalpel formation 261 there is provided the forceps formation 259. The forceps formation 259 comprises a pair of diametrically opposed wings 274, 276.

The first wing 274 is attached to the body 256 at a pivot 278 defining a pivot axis O. The first wing 274 extends from the pivot 278 at an angle P to the axis N, and is resiliently biased to this rest position by an internal spring 304 abutting a central plate 306 extending within the body 256 along the axis N. The first wing 274 can be pivoted about the pivot axis O into a recess 302 in the body 256 against the bias of the spring 304.

The second wing 276 operates in the same way as the first wing 274, and as such the wings 274, 276 can be squeezed together by the hand of a user against the resilience of the springs to simulate use of a real pair of forceps. Both wings extend radially outwardly moving away from the tool tip, like a pair of forceps.

The scalpel formation 261 is simply a plain, cylindrical part of the body 256 which can be gripped to simulate a scalpel in use.

The formations 257, 259, 261 are spaced along the axis N making each one individually grippable.

Force transducers 308 are provided to measure the force acting on the springs 304 driven by the wings 274, 276 (and thereby their displacement as a result of Hooke's law) for input into the simulated environment.

Variations fall within the scope of the present invention. As well as transducers alone, actuators can be placed within the handpieces 112, 114 to provide variable resistance and haptic feedback to the various formations. As such, the syringe could be configured to simulate the real behaviour of a fluid being ejected, the response of the scissors could be tailored to simulate the feeling of cutting through tissue, and the forceps could remain clamped to simulate locking forceps.

In a further embodiment, touch sensors (e.g. capacitive or resistive sensors) are placed in the exterior surface of the formations to detect when that particular formation is being held (and before it is actuated). In this manner, a signal can be passed to the computer containing data concerning which formation is in use. The simulation can then switch to the relevant mode for the handpiece in question, and simulate the appropriate tool. For example, if such sensors are placed on the flange 172 of the plunger 170, the handpiece can detect contact before the user actuates the syringe. The simulation can then switch the handpiece in question to "syringe mode", both simulating a syringe on the VDU and recognising any subsequent forces on the plunger. Similarly, such sensors on the wings 174, 176 can produce the equivalent effect for the scissors.

The plunger of the syringe may be movably mounted in the handpiece, and its position sensed by a linear transducer, or spring and force sensor assembly. This increases the complexity and cost of the handpiece, but also increases the realism in use.

Other tools may be represented on the handpiece, for example (inter alia):
Weck spears;
Cautery tools for example cautery tips;
Lens loops;
Sinskey hooks;
Phacoemulsification probes;
Dentist's mirrors;
Needles;
Crescent blades;

Knives, for example 15 degree supersharp knives or stab knives, or keratomes or slit knives; and Forceps, for example colibri forceps or 10 L forceps.

The syringe that is represented on the handpiece may be any type of syringe, for example a syringe having an angular or angled cannula or a syringe having a lens loop or a syringe having a simcoe cannula or a syringe and cystotome. The syringe that is represented may be unloaded, or may be loaded with a viscoelastic substance or liquid. The syringe that is represented may be loaded with saline or antibiotic or other solution or liquid.

The invention claimed is:

1. A medical simulator handpiece (112; 114) comprising:
    a body (156; 180);
    a first formation (157; 184) on the body of the handpiece, the first formation representing a first medical tool; characterised by;
    a second formation (159, 161; 186) on the body of the handpiece, the second formation representing a second, different medical tool;
    in which the first and second formations are connected and spaced apart to permit a user to manipulate one or other of the first and second formations by hand.

2. A medical simulator handpiece (112; 114) according to claim 1, in which one of the first and second formations (159; 186) represents scissors or forceps.

3. A medical simulator handpiece (112; 114) according to claim 2, in which the one of the first and second formations comprises a first member (174; 188) mounted to the body for movement relative thereto to simulate scissors or forceps.

4. A medical simulator handpiece (112; 114) according to claim 3, in which the one of the first and second formations comprises a second member (176; 190) mounted to the body for movement relative thereto, the first and second members being movable towards and away from each other.

5. A medical simulator handpiece (112; 114) according to claim 2, in which the one of the first and second formations comprises a first member (174; 188) and a second member (176; 190) mounted to the body, the first and second members being movable towards and away from each other to simulate scissors or forceps.

6. A medical simulator handpiece (112; 114) according to claim 4, in which the first member (174; 188) and the second member (176; 190) are pivotably mounted to the body (156; 180).

7. A medical simulator handpiece (112; 114) according to claim 4, in which the first member (174; 188) and the second member (176; 190) are resiliently biased in a direction away from each other (156; 180).

8. A medical simulator handpiece (112; 114) according to claim 1, in which one of the first and second formations (157) represents a syringe.

9. A medical simulator handpiece (112; 114) according to claim 8, in which the one of the first and second formations comprises a plunger (168) formation.

10. A medical simulator handpiece (112; 114) according to claim 9, in which the body defines a flange (162) proximate the end of the body proximate the plunger formation.

11. A medical simulator handpiece (112; 114) according to claim 8, in which the plunger formation is static relative to the handpiece.

12. A medical simulator handpiece (112; 114) according to claim 8, in which the plunger formation is movable relative to the handpiece.

13. A medical simulator handpiece (112; 114) according to claim 1, in which one of the first and second formations (159; 186) represents a scalpel or knife handle.

14. A medical simulator handpiece (112; 114) according to claim 1, in which one of the first and second formations (157, 159; 186) comprises a sensor configured to sense a user input indicative of use of the formation.

15. A medical simulator (100) comprising;
    a computer (102) having a memory and a processor, the memory storing medical simulation software configured to simulate a medical procedure when executed by the processor;
    an input device (108, 110, 112, 114) connected to the computer, the input device configured to provide a user input to the simulated medical procedure;
    the input device comprising a medical simulator handpiece comprising:
    a body (156; 180);
    a first formation (157; 184) on the body of the handpiece, the first formation representing a first medical tool; and
    a second formation (159, 161; 186) on the body of the handpiece, the second formation representing a second, different medical tool;
    in which the first and second formations are connected and spaced apart to permit a user to manipulate one or other of the first and second formations by hand.

16. A medical simulator (100) according to claim 15, wherein the first and second formations (157, 159; 186) comprise respective first and second sensors configured to sense a user input indicative of use of the corresponding formation, in which the medical simulation software is configured to receive data from the first and second sensors, wherein the simulation software is configured to switch between:
    a first mode indicative of use of the first formation in which data from the second sensor does not influence the simulation; and,
    a second mode indicative of use of the second formation in which data from the first sensor does not influence the simulation.

* * * * *